June 21, 1938.　　C. M. EASON　　2,121,075
CLUTCH MECHANISM
Filed Aug. 10, 1936　　6 Sheets-Sheet 1
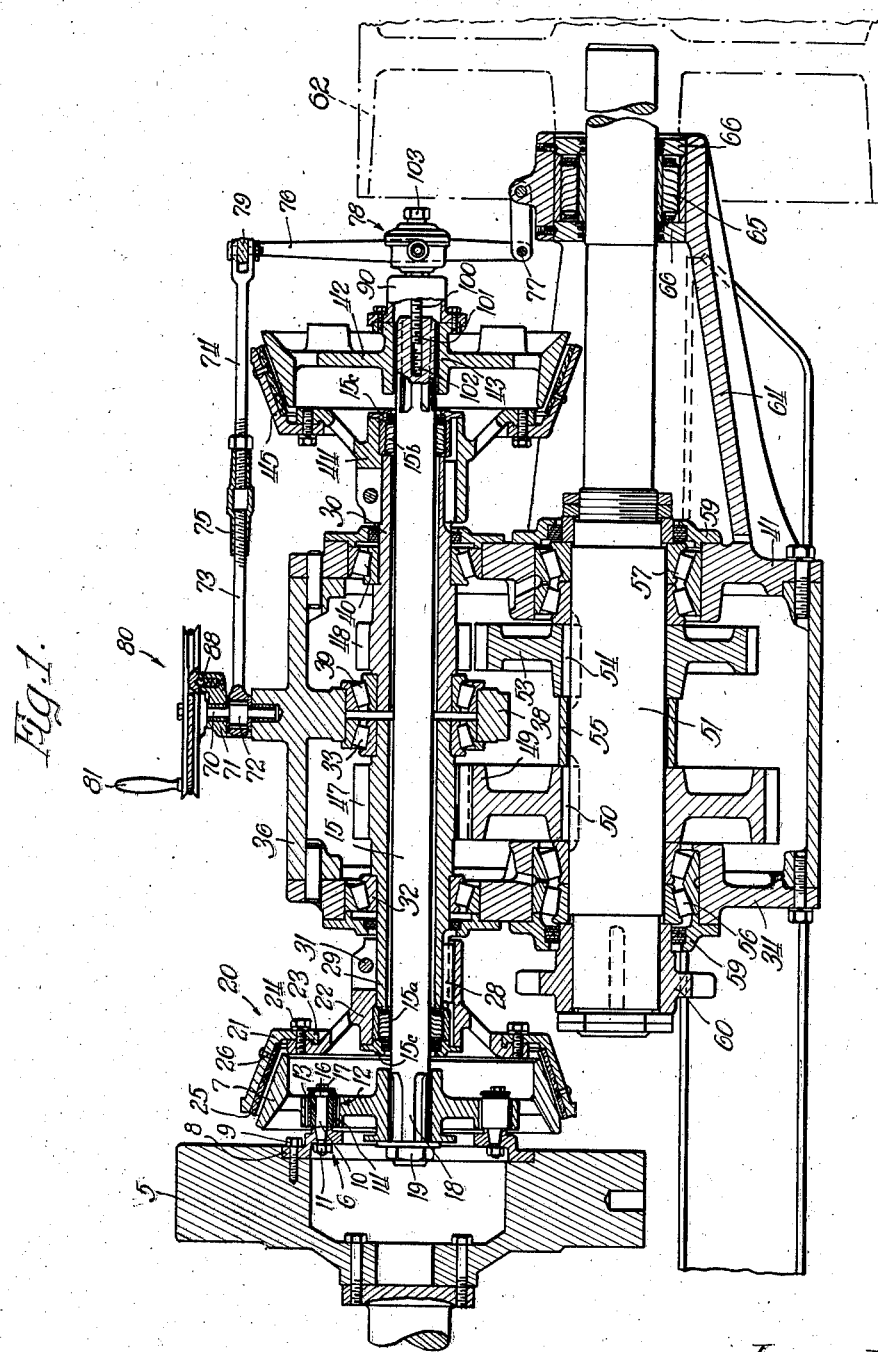
Inventor:
Clarence M. Eason.

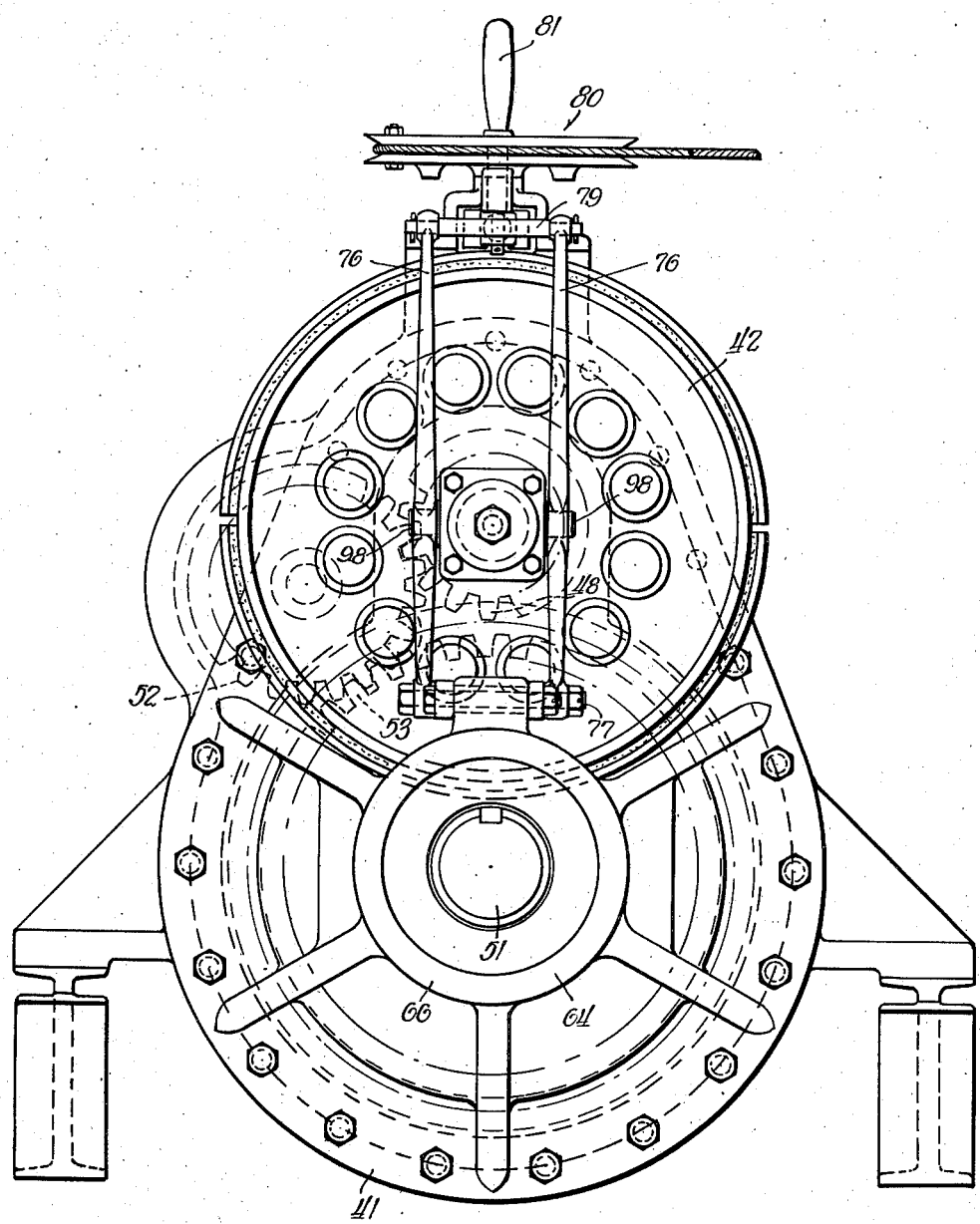

June 21, 1938.     C. M. EASON     2,121,075
CLUTCH MECHANISM
Filed Aug. 10, 1936     6 Sheets-Sheet 3
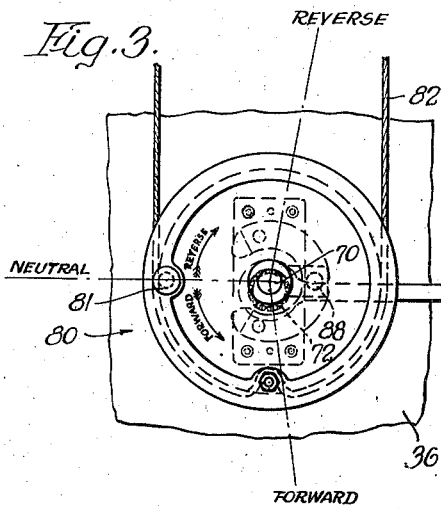
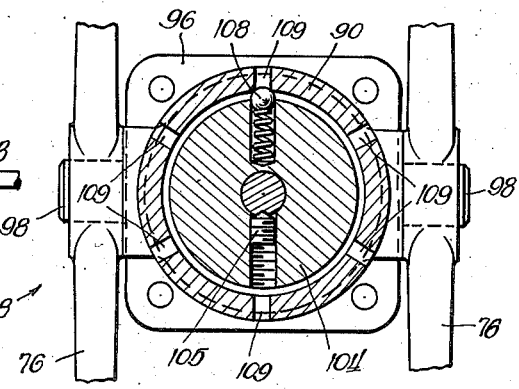
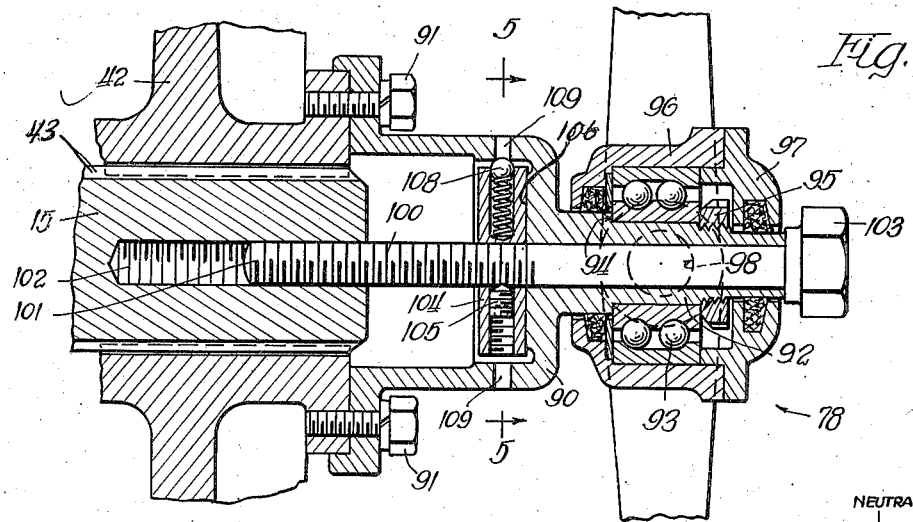
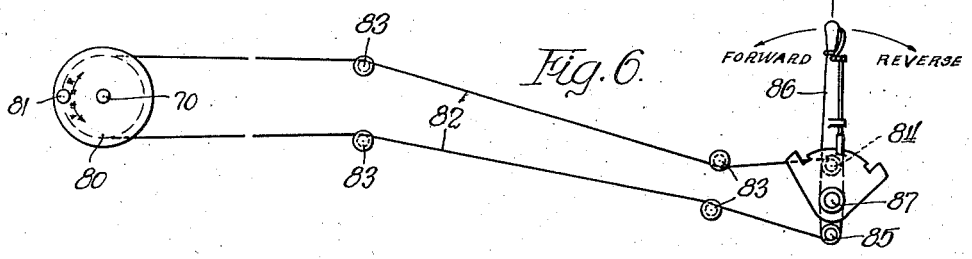
Inventor:
Clarence M. Eason.

June 21, 1938. C. M. EASON 2,121,075
CLUTCH MECHANISM
Filed Aug. 10, 1936 6 Sheets-Sheet 4

Inventor:
Clarence M. Eason.
By Brown, Jackson, Boettcher & Dienner
Attys.

June 21, 1938.  C. M. EASON  2,121,075
CLUTCH MECHANISM
Filed Aug. 10, 1936   6 Sheets-Sheet 5

Inventor:
Clarence M. Eason.

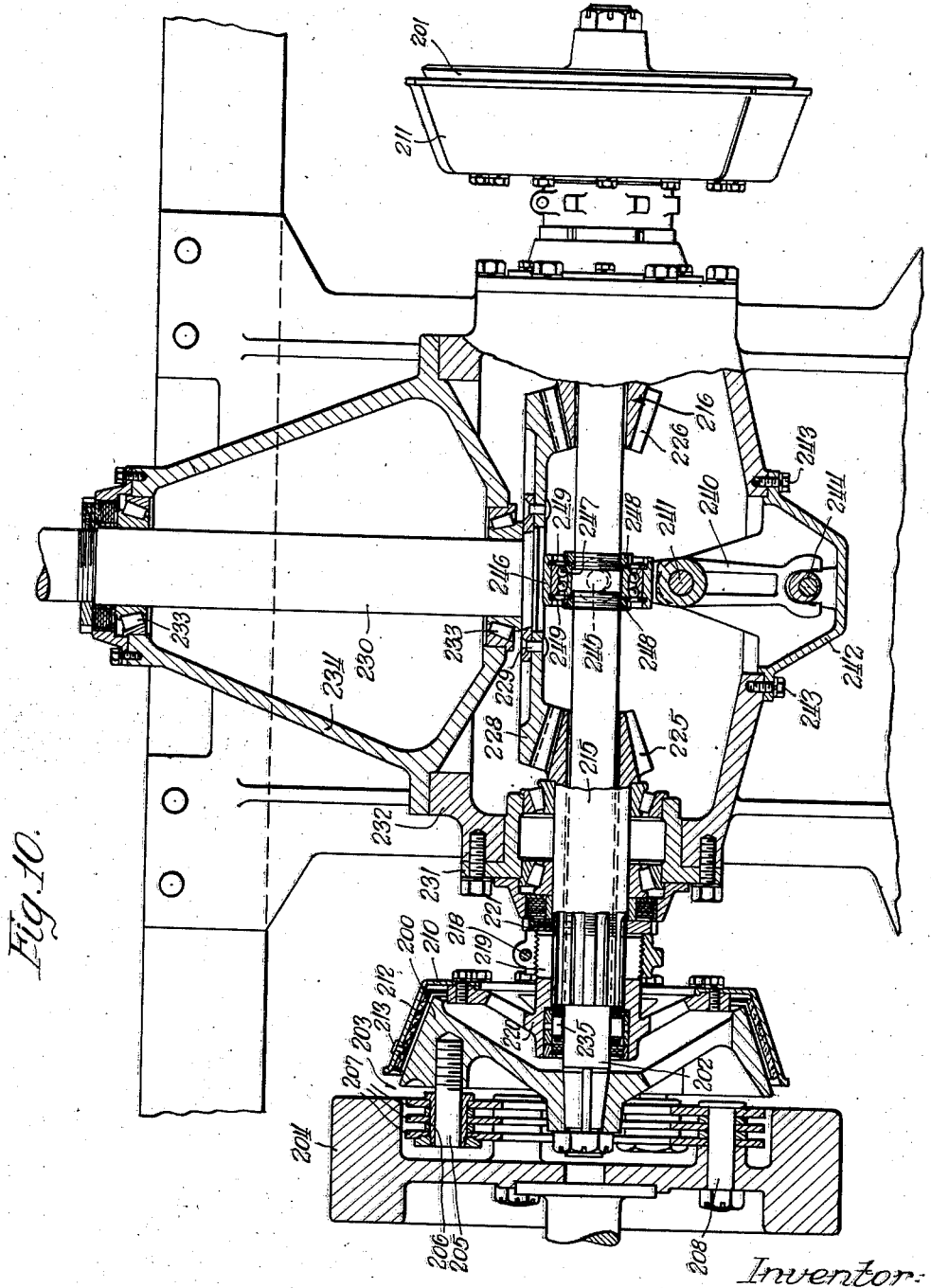

Patented June 21, 1938

2,121,075

UNITED STATES PATENT OFFICE 2,121,075

CLUTCH MECHANISM

Clarence M. Eason, Waukesha, Wis., assignor to Industrial Clutch Company, a corporation of Wisconsin Application August 10, 1936, Serial No. 95,064

13 Claims. (Cl. 192—48)

This invention relates to power transmission apparatus and, more particularly, to an improved clutch mechanism therefor.

While the particular devices which I shall describe hereinafter in connection with the drawings are reversing transmissions, it is to be understood that the clutch mechanism of the present invention is not limited to use with reversing transmissions but may be employed with change speed transmissions and in all similar devices as suitable and desired.

One of the main objects of the invention is to provide a clutch mechanism having a shiftable clutch member connected to a driving part by a resilient bushing or the like which accommodates both the shifting movement of the clutch member and absorbs stresses incident to the operation of the clutch mechanism when the associated parts are not accurately aligned. Another feature of the invention in this connection is the provision of a resilient bushing that is compressed endwise in order to fix certain of the associated parts against relative movement.

It is a further and more specific object of the invention to provide a clutch mechanism having two clutch members on a common shaft with means connected to one of said clutch members through said shaft and to the other clutch member independently of said shaft for shifting both clutch members axially together to engage one of said clutch members and simultaneously disengage the other clutch member.

It is another object of the invention to provide novel and useful shifting means for shifting the clutch members axially together to engage one of said clutch members and simultaneously disengage the other clutch member.

Another object is to provide novel and useful means for adjusting the respective clutch members for wear. In its more limited aspects and according to one illustrated embodiment of the invention, this adjusting means adjusts one clutch member independently of the other and the other clutch member by a simultaneous adjusting action on both clutch members, the independently adjustable clutch member being adapted to be adjusted independently following this adjustment of the other clutch member to set both clutch members for proper action in the operation of the device.

A further object is to provide a clutch having a male clutch member with an external conical clutch surface and a female clutch member having a cooperating internal conical surface with friction facing or lining means secured to the internal conical surface of the female clutch member instead of to the external conical surface of the male clutch member. This is highly advantageous in that if any bulge or looseness occurs in the friction facing or lining material, it will be thrown by centrifugal action out of engagement with the cooperating male cone member, thereby obviating drag which is encountered where bulged or loose friction facing material on the male clutch part is thrown out centrifugally into engagement with the cooperating female clutch part.

Further objects and advantages of the invention will be apparent from the following detailed description taken in connection with the accompanying drawings, in which:

Figure 1 is a longitudinal section through a device embodying the present invention;

Figure 2 is an end view of the same;

Figure 3 is a plan view of the hand wheel part for shifting the clutch members of the device shown in Figure 1;

Figure 4 is a fragmentary longitudinal section on an enlarged scale through the clutch shifting connection at one end of the axially shiftable driving shaft of Figure 1;

Figure 5 is a transverse detail section taken on the line 5—5 of Figure 4;

Figure 6 is a more or less diagrammatic view showing a flexible element and lever mechanism for operating the clutch shifting hand wheel part of Figure 1 from remote position;

Figure 10 is a longitudinal section similar to Figures 1 and 7 through another form of device embodying the present invention.

Figure 7:
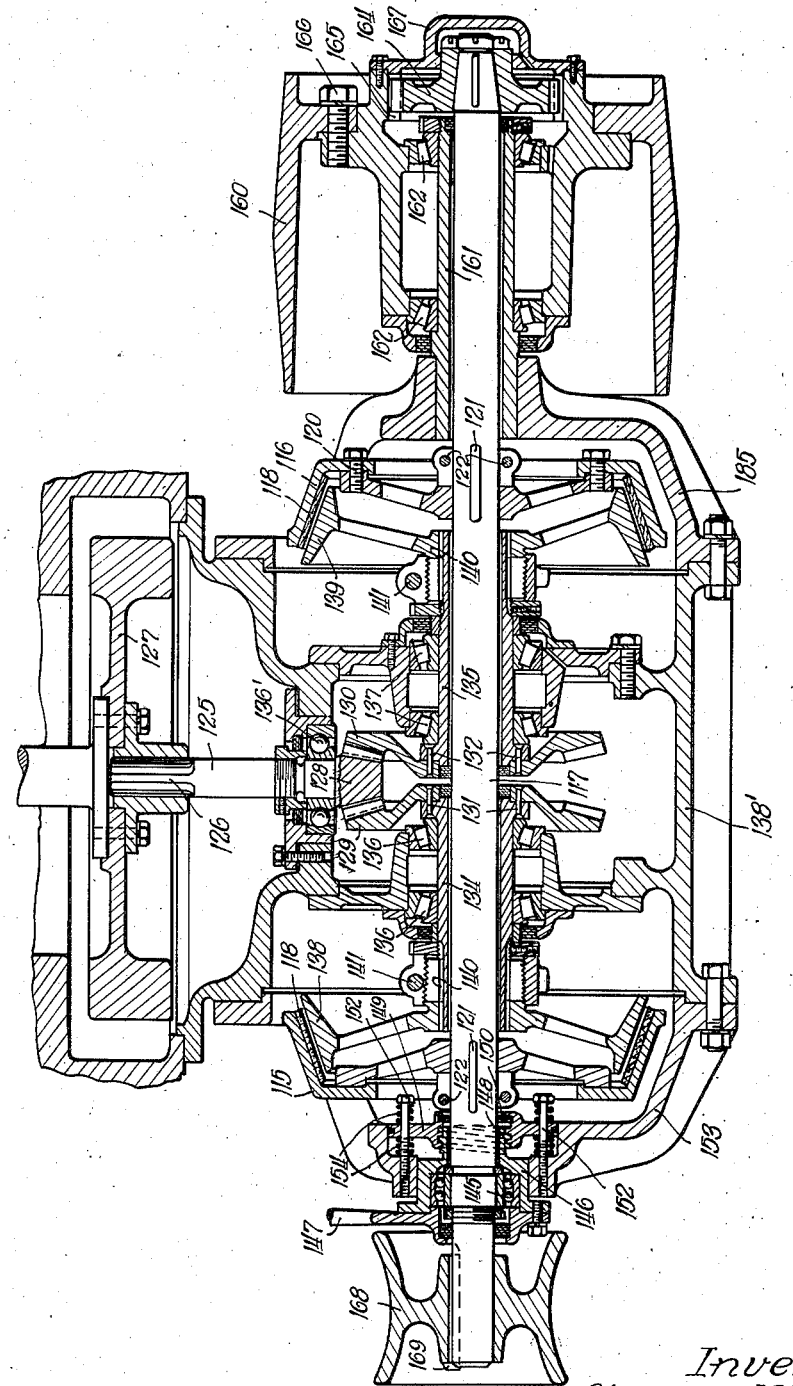
Figure 7 is a longitudinal section similar to Figure 1 through another form of device embodying the present invention.

With reference now to the drawings, in the embodiment of the invention shown in Figures 1 to 6, inclusive, 5 designates a driving member, the member shown being the flywheel of a motor drivingly connected at 6 to a driving clutch cone member 7.

The driving connection at 6 is preferably of the type disclosed and claimed in my prior Patent No. 2,089,786 issued August 10, 1937. It comprises a driving plate 8 secured by bolts 9 to the flywheel 5. Studs 10 have tapered ends secured in correspondingly tapered openings in the plate 8 by nuts 11 and extend into openings 12 in the cone member 7. Bushings 13 of rubber or other deformable and preferably resilient material are disposed about the studs 10 and within metal sleeves 14 which surround these bushings and are mounted in the openings 12 for sliding movement of the cone member 7 thereon with axial shifting movement of the driving shaft 15. The drive is transmitted from the flywheel 5 to the cone member 7 through the driving plate 8, studs 10, and bushings 13, and the bushings 13 absorb angular stresses imposed, for example, by misalignment of the parts. The bushings 13 are compressed endwise by collars 16 and cooperating nut members 17 threaded upon the adjacent reduced ends of the studs 10 to bind the sleeves 14 and bushings 13 firmly in place on the studs 10.

The cone member 7 is splined at 18 upon the driving shaft 15, and is secured against endwise movement with respect to the shaft by means of a lock nut 19. The male cone member 7 is shifted into engagement with a driven female clutch member 20 by axial movement of shaft 15 to the right (Figure 1), and is disengaged from the clutch member 20 by axial movement of the shaft 15 in the opposite direction.

The driven clutch member 20 preferably comprises a cone rim part 21 and an inner cone rim supporting part 22. The cone rim part 21 is preferably formed of relatively light weight material, such as aluminum, to reduce the inertia that must be overcome in the operation of the device. This part 21 is also preferably divided into two or any other desired number of equal length segments, each having a radial flange 23 secured to the inner part 22 by means of bolts 24. By dividing the cone rim part 21 into two or more cone rim segments, these segments may be removed and replaced at will without taking down or disassembling the entire device, and, with the segments of equal length, they are interchangeable, and therefore require no predetermined positioning relative to each other.

The inner conical surfaces of the cone rim segments, constituting the rim part 21, are preferably faced or lined with suitable friction material 25. This friction material may be in the form of arcuate facing pieces, each of a length substantially equal to the length of the respective segments and riveted at 26 or otherwise suitably secured to the cone rim segments. If any bulge or looseness occurs in the friction facing material 25, it will be thrown by centrifugal force out of engagement with the cone member 7 in the operation of the device, by reason of its application internally to the female clutch member 20 instead of externally to the male cone member 7. This obviates the drag which is encountered where bulged or loose friction facings on the male clutch part are thrown out centrifugally into engagement with the cooperating female clutch part.

The inner part 22 is keyed or splined at 28 upon a tubular driven member 29, and is split and clamped at 31 to said member and against endwise displacement thereon. The tubular member 29 is journaled in bearings 32 and 33, one mounted in the end member or head plate 34 of the casing 36, and the other mounted in a part 38 formed integral with the casing intermediate the ends thereof. A second tubular driven member 30, coaxial with the member 29, is journaled in bearings 39 and 40, one mounted in the part 38 and the other mounted in the other end member or head plate 41 of the casing 36.

The shaft 15 extends loosely through the members 29 and 30 for axial shifting movement therein, and at the end opposite the driving clutch cone member 7, has a similar but reversely disposed driving cone member 42 splined thereon at 43. The adjacent end of the tubular driven member 30 has a cone rim supporting part 44 similar to the part 22 and similarly splined and secured against endwise movement thereon. The cone rim part 45 is similar to the cone rim part 21, and these parts 21 and 45 and the segments thereof are preferably interchangeable, so that when the friction lining of the cone rim at the clutch where the wear is greater, as will hereinafter appear, has worn as much as practicable, this cone rim part may be interchanged with the cone rim part at the clutch where the wear is less, and will have further usefulness at that clutch. The shaft 15 is journaled short of its opposite ends in bearings 15a and 15b mounted respectively in the cone rim supporting parts 22 and 44, and held in place by suitable retainers 15c.

The tubular driven members 29 and 30 are formed with or have fixed thereon spur pinions 47 and 48, respectively. The pinion 47 is positioned between the bearings 32 and 33, and the pinion 48 is positioned between the bearings 39 and 40. While, as I have already stated, the present invention is not limited to use with reversing transmissions but may be employed with change speed transmissions and in all similar devices as suitable or desired, the particular device shown is a reversing transmission, and the forward drive is transmitted through the pinion 47, whereas the reverse drive is transmitted through the pinion 48.

The pinion 47 meshes with a spur gear 49 keyed at 50 on a counter or lay shaft 51. The pinion 48 meshes with an idler spur pinion 52 which, in turn, meshes with a spur gear 53 keyed at 54 on countershaft 51, whereby to transmit the drive to the shaft 51 in the reverse direction. A spacing sleeve 55 is mounted on the shaft 51 between the gears 49 and 53, and the shaft 51 is journaled in bearings 56 and 57 mounted in the end members or head plates 34 and 41, respectively. Retainer rings 59 hold the bearings 56 and 57 in place.

The left hand end (Figure 1) of the shaft 51 may be provided outwardly of the bearing 56 with a sprocket 60 keyed or splined thereon. The opposite end of the shaft 51 may be extended and provided with a pulley 62 splined or otherwise fixed thereon, or it may be terminated just outwardly of the bearing 57, in which case a sprocket, similar to the sprocket 60, may be splined on the shaft 51 just outwardly of the bearing 57. Where the shaft 51 is extended and provided with the pulley 62, the head plate 41 is provided with an integral extending bracket part 64, and the shaft 51 is journaled adjacent the hub of the pulley 62 in a bearing 65 mounted in this extension bracket 64. Bearing retainers are provided at 66.

From the foregoing description it will now be apparent that the shaft 15 constitutes a common driving shaft for the two clutches. Axial movement of the driving clutch members 7 and 42 to the left (Figure 1) moves the clutch member 42 into engagement with the inner clutch surface of the cone rim or driven cone part 45 and, simultaneously, the driving clutch cone 7 out of engagement with the cone rim or driven clutch part 21. When the clutch cone 42 is engaged with the cooperating driven clutch part and the clutch 7 is disengaged, a reverse drive is transmitted through the pinion 48, idler 52, and gear 53, to the shaft 51, and when the clutch cone 7 is engaged and the clutch cone 42 disengaged, forward drive is transmitted through pinion 47 and meshing gear 49 to the shaft 51. The particular reversing gear and pinion arrangement shown provides about a three-to-one forward ratio, i. e., about three revolutions of the driving shaft 15 for each revolution of the shaft 51, and a slightly less reduction, i. e., about a two and one-half to one ratio in reverse. These particular ratios may vary widely within the scope of the present invention, and it will be understood that the same principles cover the use of stepping up the speed by reversing the relation of the gears.

As already pointed out, the device may be a change speed transmission instead of a reversing transmission. This can be accomplished in this embodiment of the invention by merely omitting the idler pinion 52 and meshing the pinion 48 directly with the gear 53. In such case, the ratio between the gears 47 and 49 will differ from the ratio between the gears 48 and 53, according to the change speeds it is desired to obtain.

Within the broader aspects of the present invention, any suitable means may be provided for shifting the shaft 15 and clutch member 42 axially or endwise to reverse the drive or to change the ratio thereof.

The particular shifting means shown in connection with the embodiment of Figures 1 to 6, inclusive, comprises an eccentric shaft 70 rotatably journaled in the casing 36 and in a plate 71 secured to the casing. The eccentric shaft 70 is provided with an eccentric portion 72 having eccentric connection, through needle bearings, with the adjacent end of one of two connecting rods 73 and 74. The rods 73 and 74 are connected together by a turnbuckle 75 having threaded engagement with the adjacent ends of the rods, this turnbuckle 75 constituting an adjustment means for the rear reversing clutch member 42 as will hereinafter appear. The rear end of the rod 74 is connected to the upper ends of a pair of arms 76 pivoted at their lower ends at 77 to the extension bracket 64, and connected at 78 to the adjacent end of the driving shaft 15 and to the cone member 42. Rotation of the eccentric shaft 70 shifts the rods 73 and 74 endwise, swinging the arms 76 about their pivots 77 and shifting the shaft 15 and cone members 7 and 42 axially through the connection at 78.

The connection between the rod 74 and the arms 76 comprises a forked end on the rod 74 fitting over a compensating member 79 and having pin connection with the intermediate portion thereof. The upper ends of the arms 76 are swingably mounted on the ends of the member 79, and this member compensates for and obviates binding due, for example, to inaccuracies in machining and assembly. Assembly is thus made easy and proper operation is assured in spite of inaccuracies in such assembly or in machining, or for any other reason.

The eccentric shaft 70 is rotated by means of a hand wheel 80 fixed on the upper end of the shaft 70 and provided with a handle 81 for turning the same. The hand wheel 80 is grooved peripherally to receive a cable or other flexible element 82 for turning the wheel from remote position. Where the flexible element 82 is employed the wheel 80 may be disposed in cooperation with a bight intermediate the ends of the element 82, and this element may be trained over sheaves 83 and connected at its opposite ends at 84 and 85 to a control lever 86 pivoted at 87 as shown in Figure 6. Swinging of the lever 86 in one direction about its pivot 87 turns the eccentric shaft 70 in one direction, and swinging of the lever 86 in the opposite direction turns the eccentric shaft in the opposite direction. A spring-pressed ball or detent member 88 holds the wheel 80 in the positions into which it is turned.

The connection at 78 comprises a member 90 having at one end an enlarged tubular part provided with a flanged end bolted at 91 to the hub of the driving cone member 42. The opposite end of the member 90 has a reduced tubular spindle 92 rotatable in a ball-bearing 93. The ball-bearing 93 is held against endwise movement on the spindle 92 between a shoulder 94 and a nut 95 threaded on the spindle as shown in Figure 4, and also against endwise movement in a retainer 96 having a retainer cap 97 bolted thereto. The retainer 96 has diametrically opposite pins 98 which fit in openings in the arms 76, or otherwise cooperate with these arms whereby the retainer 96, bearing 93, member 90, and driving cone member 42 are shifted axially as a unit with swinging movement of the arms 76, the engagement of the pins 98 with the arms 76 allowing the arms 76 to swing and actuate the assembly endwise without binding stresses upon the parts.

A bolt 100 connects the arms 76 to the shaft 15 to shift the same axially by swinging movement of the arms. This bolt passes axially through the spindle 92, and has threaded engagement at its inner end at 101 in a threaded axial opening 102 in the adjacent end of the shaft 15. The head 103 on the outer end of the bolt 100 cooperates with the outer end of the spindle 92, and a collar 104 is fixed on the bolt 100 by a set screw 105 (Figure 4) and cooperates with the radial shoulder 106 of the member 90, whereby the bolt 100 and member 90 are held against relative axial movement.

The bolt 100 constitutes adjustment means for the forward driving cone member 7. By engaging a wrench or other suitable tool with the head 103 and turning the bolt, the threaded engagement at 101 shifts the shaft 15 axially and, with it, the cone driving member 7 for the purpose of adjusting the action of the "forward" drive clutch. In this adjustment of the "forward" clutch, the splines on the shaft 15 at 43 slide endwise with respect to the engaging splines on the rear "reverse" driving cone member 42, it being understood that there is no such sliding action at this splined connection in the normal operation of the device. A simple and highly effective adjustment for the "forward" clutch is thus provided.

The turnbuckle 75 constitutes adjustment means for the "reverse" driving cone member 42 which, in the illustrated device, is used only in reverse operation, and therefore does not require as much or as frequent adjustment as the "forward" clutch. By turning the turnbuckle 75, the arms 76 are swung about their pivots 77, shifting the member 90 endwise and, with it, the driving cone member 42 to secure the desired adjustment of the rear "reversing" clutch. This adjustment also shifts the shaft 15 axially through the bolt 100, so that when the rear "reversing" clutch is thus adjusted, the bolt 100 must be manipulated to adjust the "forward" clutch for the purpose of assuring the desired action of both clutches. The adjustment of the "forward" clutch, however, which requires more adjustment than the rear clutch, is accomplished independently of the rear clutch, and no accompanying adjustment of the rear clutch is necessary when the "forward" clutch is adjusted. In view of the less frequent adjustment of the rear "reversing" clutch, the adjustment of the "forward" clutch which must accompany the same is infrequent and presents no practical problem. The collar 104 carries a spring-pressed ball or detent 108 which cooperates with circumferentially spaced openings 109 in the member 90 to yieldingly hold the bolt 100 in the different positions into which it is turned with respect to the member 90.

Figure 8:
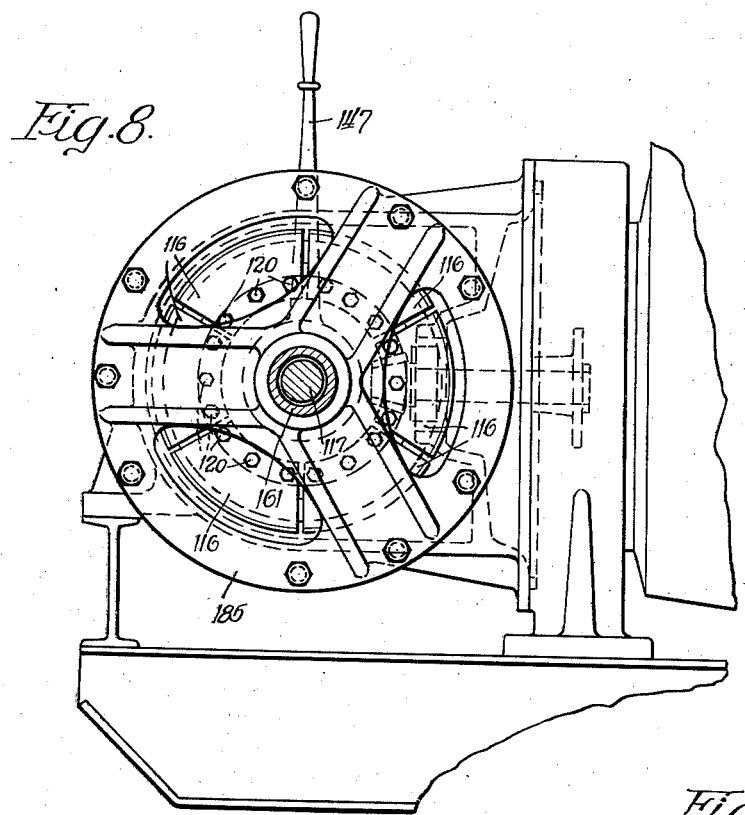
Figure 8 is an end view of the same.
Figure 9:
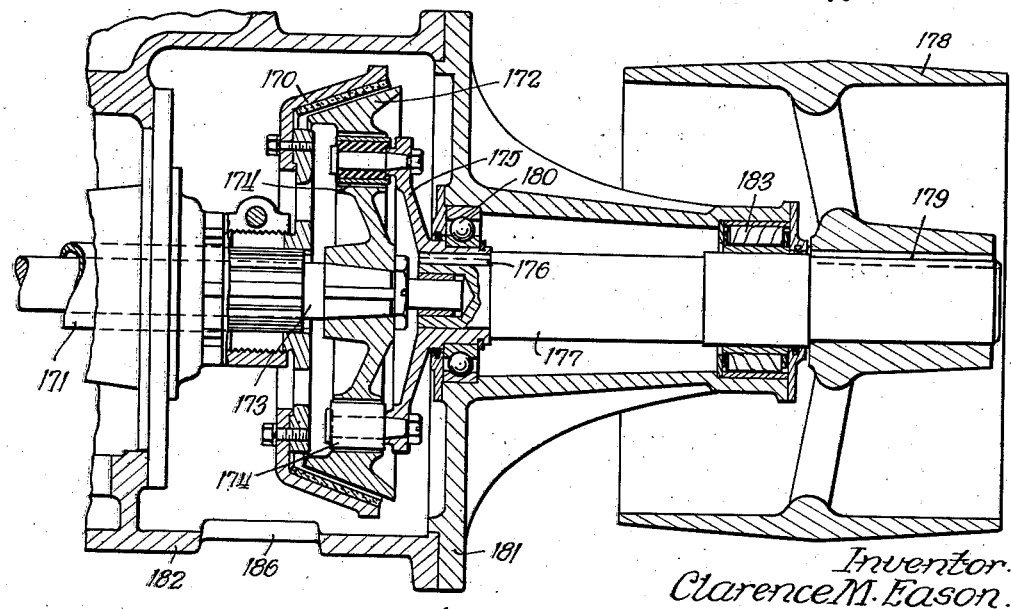
Figure 9 is a fragmentary longitudinal section showing an optional mounting for the drive pulley of the device shown in Figures 7 and 8.

In the embodiment of the invention shown in Figures 7, 8 and 9, the two clutch members, which are shiftable axially together to engage either one of the clutches and simultaneously disengage the other clutch, are in the form of female clutch members 115 and 116 instead of male clutch members, as in the preceding embodiment of the invention, and these clutch members 115 and 116 are mounted on the driven shaft 117, instead of on the driving shaft, as in the preceding embodiment.

The rim parts of the female clutch members 115 and 116 are preferably formed of relatively light weight material, such as aluminum, or they may be made of pressed sheet steel along the line more fully set forth in my copending application, Serial No. 90,932, filed July 16, 1936. As in the preceding embodiment of the invention, the friction lining 118 is preferably riveted or otherwise secured to the inner conical surfaces of the members 115 and 116, and the rim parts of these members are preferably divided into two or more segments to permit ready removal and replacement without disturbing any of the rest of the units. The rim parts are secured by bolts 120 to the inner rim supporting parts which are splined at 121 and fixed against endwise movement at 122 on the shaft 117 for axial shifting movement and rotation therewith.

The driving shaft 125 has splined connection at 126 with the hub of the engine flywheel 127 or other driving member. A bevel pinion 128 is formed on or fixed to the shaft 125 for rotation therewith, and meshes with opposed bevel gears 129 and 130 fixed at 131 and 132 upon the adjacent ends of the tubular driving members 134 and 135, respectively, which surround the driven shaft 117. The members 134 and 135 are journaled in bearings 136 and 137 mounted in suitable retainer members carried by the casing 138', and the driving shaft 125 is journaled in a bearing 136' mounted in a suitable retainer also carried by the casing.

The male clutch member 138 for "forward" drive and the male clutch member 139 for "reverse" drive are splined at 140 and fixed at 141 against endwise movement on the outer ends of the tubular driving members 134 and 135. The bevel gear set is constantly driven, and either clutch member 115 or 116 is engaged with its cooperating driving clutch member, and the other clutch simultaneously disengaged by shifting the shaft 117 axially. Adjustment for wear of the friction linings 118 is made by adjusting the respective driving clutch members 138 and 139 on the tubular driving members 134 and 135. For this purpose, the hub of each driving clutch member 138 and 139 is split and surrounded by a threaded set collar at 141 which serve as clamps to lock these clutch members to the splined ends of the members 134 and 135, as well as to provide for setting the clutch members 138 and 139 up independently of each other to compensate for lining wear.

Axial shifting of the driven shaft 117, which carries the driven clutch members 115 and 116, is accomplished in this embodiment of the invention by means of a ball-bearing 145 carried by a retainer 146 which is rotatable by means of a hand lever 147. The retainer 146 is provided with screw threads 148 engaging corresponding screw threads in a nut 149, oil sealing means being provided at 150. Bolts 152 pass through openings in the nut 149 and have threaded engagement in the head or end plate 153 of the casing 138' to hold the nut 149 against turning movement. Springs 154 are disposed between opposite sides of the nut and the end or head plate 153 and the heads of the bolts 152. Rotation of the retainer 146 by the lever 147 shifts the shaft 117 axially through the bearing 145 which is held to the shaft 117 and retainer 146 for endwise movement of these parts as a unit.

The ball-bearing 145 also supports the shaft 117 at one end, and eliminates the necessity for a roller bearing between this shaft and the hub of the adjacent driving clutch member. The opposite end of the shaft 117 is supported by the drive pulley 160 which is preferably mounted on a stationary stub shaft 161 through bearings 162 as shown in Figure 7. In this embodiment, the drive from the shaft 117 to the pulley 160 is accomplished through a helical external gear 164 splined upon the adjacent end of the shaft 117 and meshing with a corresponding internal gear 165 on the hub structure of the pulley 160, which hub structure is secured by bolts 166 to the pulley rim. A cap member 167, secured to the hub structure of the pulley 160, forms a lubricant-tight enclosure for the adjacent end of the shaft 117 and the gears 164 and 165. A take-off pulley 168 may be keyed at 169 upon the opposite extending end of the shaft 117. The helical engagement of the gears 164 and 165 is such as not to interfere with the axial shifting movement of the shaft 117.

An optional mounting for the drive pulley is shown in Figure 9. This view shows the female clutch member 170 mounted on the tubular driving member 171 and the cooperating male clutch member 172 mounted on the shiftable driven shaft 173. Flexible driving connections at 174, similar to the flexible or yielding driving connections between the flywheel 5 and the clutch member 7 of Figure 1, provide yielding driving connections between the clutch member 172 and a spider 175, which yielding connections at the same time permit axial sliding movement of the clutch member 172 with respect to the spider 175. The spider 175 is keyed at 176 upon the adjacent end of the stub shaft 177 upon which the pulley 178 is keyed at 179. The hub of the spider 175 is journaled in a ball-bearing 180 mounted in the head member 181 attached to the casing 182, and the shaft 177 is rotatably journaled adjacent the hub of the pulley 178 in a roller bearing 183.

In order readily to replace the segmented female cone carrying the friction linings, openings are provided either in the head member 185 which supports the drive pulley as shown in Figure 7, or in the casing 182 itself as indicated at 186 in Figure 9. In Figure 7, the head plate 185 supports the stationary stub shaft 161 upon which the pulley 160 is rotatably mounted.

In the embodiment of the invention illustrated in Figure 10, the male cone clutch members 200 and 201 are fixed upon the axially shiftable driving shaft 202, a flexible disc type coupling 203 being shown between the engine flywheel 204 or other driving member, and the "forward" driving clutch member 200, instead of the type of connection shown in Figure 1, thereby eliminating the separate coupling plate shown in Figure 1. In this case, there are three or any other desired number of pins 205 anchored in the "forward" cone member 200, which pins engage in thimbles 206 in the flexible discs 207 which are bolted at three or any other desired number of intermediate points, indicated at 208, to the driving engine flywheel 204.

The cone rim parts of the female clutch members 210 and 211 are preferably made of pressed sheet steel to which the linings 212 are riveted at 213 or otherwise suitably secured. The female cone rim parts and linings are split into two or more segments and can be readily removed or replaced without disturbing any of the rest of the unit. The female clutch members are splined and secured against axial movement on the outer ends of the tubular driven members 215 and 216 which surround the driving shaft 202. Adjustment for wear is effected independently in the female clutch members by the split clamp collars 218 threaded onto the outside of the split hub 219 of the spiders or inner female rim carrying parts 220. The split adjusting collars 218 bear against the fixed set collars 221 threaded to the splined portions of the members 215 and 216.

Bevel pinions 225 and 226, formed or fixed on the inner ends of the tubular members 215 and 216, mesh at diametrically opposite positions with the driven bevel gear 228 fixed at 229 to the driven shaft 230. The tubular members 215 and 216 are journaled in bearings carried by retainers 231 secured to the casing 232, and the shaft 230 is journaled in bearings 233 carried by the member 234. The shiftable driving shaft 202 is journaled in bearings 235 mounted in the hub parts of the female clutch members 210 and 211.

In this embodiment of the invention, major movement, when not under load, takes place between the pins 205 and thimbles 206, but the minor movement, when under load and while one of the clutches is engaged, takes place within the flexible discs.

Shifting of the driving shaft 202 axially in this embodiment of the invention for the purpose of selectively engaging either clutch and simultaneously disengaging the other clutch is accomplished in this embodiment of the invention by means of a lever 240 pivoted at 241 to a member 242 bolted at 243 to the casing 232. The lower end of the lever 240 is forked to engage an operating eccentric 244, operated or manipulated in any suitable or desired manner. The opposite end of the lever 240 is similarly forked to engage diametrically opposite pins 245 projecting from opposite sides of a bearing retainer 246. The bearing 247 is held against endwise movement on the intermediate part of the shaft 202 by retainer rings 248. This bearing is also held by split rings 249 or otherwise as desired against endwise movement with respect to the retainer 246, so that upon swinging the lever 240, the retainer 246 is shifted endwise and the shaft 202 moves endwise with the retainer.

I do not intend to be limited to the precise details shown or described.

I claim:

1. In combination, a pair of clutches, each including a shiftable clutch member, said shiftable clutch members being coaxially disposed, and means for adjusting said shiftable clutch members axially in unison for wear of one of said clutches and for adjusting one of said shiftable clutch members axially independently of the other shiftable clutch member for wear of the other clutch.

2. In combination, a common driving shaft, a first clutch member mounted to turn with said shaft and against endwise movement thereon, a second clutch member mounted to turn with said shaft and for axial adjustment of the shaft with respect thereto, a cooperating clutch member for each of said first and second clutch members, means for shifting said shaft and said first and second clutch members axially in unison to engage one of said first and second clutch members with its cooperating clutch member and simultaneously to disengage the other of said first and second clutch members from its cooperating clutch member, and means for adjusting said first and second clutch members axially in unison for wear of one of said clutch members and for adjusting one of said first and second clutch members independently of the other for wear of another of said clutch members.

3. In combination, a pair of clutch members, a common shaft for said clutch members, clutch members cooperable with said first clutch members, pivoted arm means for shifting said shaft and said first clutch members axially in unison selectively to engage one of said first clutch members with its cooperating clutch member and to disengage the other of said first clutch members from its cooperating clutch member, an adjustable connection between said arm means and said shaft for adjusting one of said first clutch members, a link for actuating said pivoted arm means, and a turnbuckle in said link for adjusting the other of said first clutch members by axial adjustment of both said first clutch members.

4. In combination, a pair of clutch members, a common shaft for said clutch members, clutch members cooperable with said first clutch members, pivoted arm means for shifting said shaft and said first clutch members axially in unison selectively to engage one of said first clutch members with its cooperating clutch member and to disengage the other of said first clutch members from its cooperating clutch member, a link for actuating said pivoted arm means, an eccentric shaft for actuating said link, means on said shaft for turning same, said means comprising a grooved hand wheel having a handle, a pivoted lever, and a flexible element trained about the groove in said hand wheel and connected to said lever for turning said eccentric shaft from remote position by actuation of said lever.

5. In combination, a driving flywheel, a shiftable driving clutch member having an opening therein and a friction surface, a stud connected to said flywheel and extending into said opening, a sleeve slidably bearing in said opening, a bushing of resilient material disposed in said sleeve and about said stud for transmitting torque from the flywheel to the shiftable clutch member, said bushing absorbing stresses imposed by misalignment and compressed endwise to bind the sleeve, stud, and bushing together against relative movement, and a driven clutch member having a friction surface cooperable with the friction surface of said shiftable clutch member on the side of the sleeve stud and bushing assembly opposite the side on which said driving flywheel is disposed.

6. In combination, a driving member, a driven member, a pair of clutch members having cooperating friction surfaces for connecting said driving and driven members, a shiftable shaft carrying the driving member of said pair of clutch members, and means ahead of the cooperation between the friction surfaces of said clutch members for yieldingly connecting said shiftable shaft to said driving member to accommodate misalignment between the latter and said shaft and to accommodate shifting movement of said shaft.

7. In combination, a driving member, a driven member, a pair of clutch members having cooperating friction surfaces for connecting said driving and driven members, an axially shiftable shaft carrying one of said clutch members, said shaft being shiftable to engage and disengage said clutch members, and means ahead of the cooperation between the friction surfaces of said clutch members for yieldingly connecting said one clutch member to said driving member, said last means comprising resilient members between the driving member and the connected clutch member adapted for relative endwise movement to accommodate said axial shifting of said shaft and the connected clutch member.

8. In combination, driving and driven members, a pair of clutch members having cooperating friction surfaces for connecting said driving and driven members, an axially shiftable shaft carrying one of said clutch members, said shaft being shiftable to engage and disengage the cooperating friction surfaces of said clutch members, means connecting the other clutch member with one of said driving and driven members, and means for yieldingly connecting said shaft and said one clutch member to the other of said driving and driven members, said last means comprising members adapted for relative endwise movement to accommodate said axial movement of said shaft and one clutch member.

9. In combination, a driving member, a shiftable driving clutch member having a friction surface, one of said members having an opening therein, a stud connected to the other of said members and extending into said opening, a sleeve slidably bearing in said opening, a bushing of resilient material disposed in said sleeve and about said stud for transmitting torque from the driving member to the shiftable clutch member, said bushing absorbing stresses imposed by misalignment and compressed endwise to bind the sleeve, stud, and bushing together against relative movement, and a driven clutch member having a friction surface cooperable with the friction surface of said shiftable clutch member on the side of the sleeve stud and bushing assembly opposite the side on which said driving member is disposed.

10. In combination, driving and driven members, a pair of clutch members having cooperating friction surfaces for connecting said driving and driven members, an axially shiftable shaft carrying one of said clutch members, said shaft being axially shiftable to engage and disengage the cooperating friction surfaces of said clutch members, means connecting the other clutch member with one of said driving and driven members, and means for yieldingly connecting said shaft and said one clutch member to the other of said driving and driven members, said last means comprising a resilient bushing connecting said one clutch member to said other of the driving and driven members and said bushing absorbing stresses imposed by misalignment and arranged to accommodate the axial shifting movement of said shaft and the connected clutch member in engaging and disengaging said clutching surfaces.

11. In combination, a driven member, a shiftable driven clutch member having an opening therein and a friction surface, a stud connected to said driven member and extending into said opening, a sleeve slidably bearing in said opening, a bushing of resilient material disposed in said sleeve and about said stud for transmitting torque from the driven member to the shiftable clutch member, said bushing absorbing stresses imposed by misalignment and compressed endwise to bind the sleeve, stud, and bushing together against relative movement, and a driving clutch member having a friction surface cooperable with the friction surface of said shiftable clutch member on the side of said sleeve stud and bushing assembly opposite the side on which said driven member is disposed.

12. In combination, a driven member, an axially shiftable shaft disposed coaxially of said driven member, a shiftable driven clutch member carried by said shaft and having an opening therein and a friction surface, a stud connected to said driven member and extending into said opening, a sleeve slidably bearing in said opening, a bushing of resilient material disposed in said sleeve and about said stud for transmitting torque from said shiftable clutch member to said driven member, said bushing absorbing stresses imposed thereon by misalignment between said shiftable clutch member and said driven member, and a driving clutch member having a friction surface cooperable with the friction surface of said shiftable clutch member, axial movement of said shaft carrying the friction surface of said shiftable clutch member into and out of engagement with the friction surface of said driving clutch member.

13. In combination, a driving flywheel, an axially shiftable shaft disposed coaxially of said flywheel, a shiftable driving clutch member fixed to said shaft and having a friction surface, means for transmitting torque between said driving flywheel and said shiftable driving clutch member, comprising stress absorbing means connected to said flywheel and having parts shiftable relative to said shiftable clutch member to accommodate axial movement of the latter, and a driven clutch member having a friction surface cooperable with the friction surface of said shiftable clutch member, said shaft and driving clutch member being shiftable axially to engage and disengage said cooperating friction surfaces.

CLARENCE M. EASON.